(12) United States Patent
Higgins (10) Patent No.: US 9,466,260 B2
(45) Date of Patent: Oct. 11, 2016

(54) CONVERSION BETWEEN COLOR SPACES (71) Applicant: SAMSUNG DISPLAY CO., LTD., Yongin, Gyeonggi-Do (KR)

(72) Inventor: Michael Francis Higgins, Duncans Mills, CA (US)

(73) Assignee: SAMSUNG DISPLAY CO., LTD. (KR)

( * ) Notice: Subject to any disclaimer, the term of this patent is extended or adjusted under 35 U.S.C. 154(b) by 252 days.

(21) Appl. No.: 14/226,437

(22) Filed: Mar. 26, 2014

(65) Prior Publication Data

US 2015/0281523 A1    Oct. 1, 2015

(51) Int. Cl.
G09G 5/02 (2006.01)
G09G 5/06 (2006.01)
H04N 1/60 (2006.01)
G09G 3/34 (2006.01)

(52) U.S. Cl.
CPC .............. G09G 5/06 (2013.01); H04N 1/6019 (2013.01); H04N 1/6022 (2013.01); *G09G 3/3413* (2013.01); *G09G 2340/06* (2013.01)

(58) Field of Classification Search
None
See application file for complete search history.

(56) References Cited

U.S. PATENT DOCUMENTS

| | | | | |
|---|---|---|---|---|
| 8,023,149 B2* | 9/2011 | Matsuoka | ................ | H04N 1/60 345/418 |
| 2003/0214499 A1* | 11/2003 | Ohsawa | ............... | H04N 9/3105 345/204 |
| 2004/0075852 A1* | 4/2004 | Wang | ........................ | H04N 1/60 358/1.9 |
| 2005/0083352 A1* | 4/2005 | Higgins | ............... | G09G 3/2003 345/690 |
| 2011/0222080 A1* | 9/2011 | Monga | ................. | H04N 1/6025 358/1.9 |
| 2011/0267629 A1* | 11/2011 | Fan | ...................... | H04N 1/6025 358/1.9 |
| 2012/0038660 A1* | 2/2012 | Han | ..................... | G09G 3/2003 345/590 |

* cited by examiner

*Primary Examiner* — Jacinta M Crawford
*Assistant Examiner* — Diane Wills
(74) *Attorney, Agent, or Firm* — Innovation Counsel LLP (57) ABSTRACT

A computer-implemented method for converting a first color space to a second color space is provided. The method includes generating a look-up table (LUT) using a non-square transformation matrix and a numerical solver, wherein the LUT comprises a target value in the first color space and an optimal value in the second color space, and using the LUT to convert the first color space to the second color space.

18 Claims, 8 Drawing Sheets

| INDEX | R | G | B | E |
|---|---|---|---|---|
| 0 | 0 | 0 | 0 | 0 |
| 1 | 442 | 0 | 1 | 0 |
| 2 | 884 | 0 | 3 | 0 |
| 3 | 1326 | 0 | 4 | 0 |
| 4 | 1768 | 0 | 6 | 0 |
| 5 | 2210 | 0 | 8 | 0 |
| 6 | 2652 | 0 | 9 | 0 |
| 7 | 3094 | 0 | 11 | 0 |
| 8 | 3536 | 0 | 13 | 0 |
| 9 | 3978 | 0 | 14 | 0 |
| 10 | 4095 | 0 | 32 | 0 |
| 11 | 4095 | 0 | 55 | 0 |
| 12 | 4095 | 0 | 78 | 0 |
| 13 | 4095 | 0 | 102 | 0 |
| 14 | 4095 | 0 | 125 | 0 |
| 15 | 4095 | 0 | 148 | 0 |
| 16 | 4095 | 0 | 171 | 0 |
| 17 | 0 | 413 | 0 | 239 |
| 18 | 449 | 306 | 0 | 127 |
| 19 | 1043 | 91 | 0 | 0 |
| 20 | 1526 | 0 | 0 | 0 |
| 21 | 1969 | 0 | 2 | 0 |
| 22 | 2410 | 0 | 3 | 0 |
| 23 | 2852 | 0 | 5 | 0 |
| 24 | 3295 | 0 | 7 | 0 |
| 25 | 3737 | 0 | 8 | 0 |
| 26 | 4095 | 0 | 14 | 0 |
| 27 | 4095 | 0 | 37 | 0 |
| 28 | 4095 | 0 | 61 | 0 |
| 29 | 4095 | 0 | 84 | 0 |
| 30 | 4095 | 0 | 107 | 0 |
| 31 | 4095 | 0 | 130 | 0 |
| 32 | 4095 | 0 | 154 | 0 |
| 33 | 4095 | 73 | 174 | 0 |

FIG. 7B

| INDEX | R | G | B | E |
|---|---|---|---|---|
| 0 | 0 | 0 | 0 | 0 |
| 1 | 595 | -124 | 14 | -149 |
| 2 | 1190 | -427 | 29 | -299 |
| 3 | 1759 | -439 | 53 | -606 |
| 4 | 2345 | -584 | 71 | -808 |
| 5 | 2971 | -1023 | 77 | -782 |
| 6 | 3518 | -876 | 107 | -1213 |
| 7 | 4113 | -1090 | 122 | -1362 |
| 8 | 4739 | -1528 | 128 | -1337 |
| 9 | 5325 | -1674 | 145 | -1538 |
| 10 | 5864 | -1458 | 178 | -2023 |
| 11 | 6449 | -1603 | 196 | -2225 |
| 12 | 7083 | -2094 | 200 | -2158 |
| 13 | 7680 | -2321 | 214 | -2297 |
| 14 | 8208 | -2039 | 250 | -2833 |
| 15 | 8795 | -2187 | 268 | -3033 |
| 16 | 9391 | -2399 | 283 | -3184 |
| 17 | -134 | 420 | -37 | 376 |
| 18 | 453 | 264 | -19 | 181 |
| 19 | 1040 | 113 | -1 | -17 |
| 20 | 1665 | -318 | 4 | 3 |
| 21 | 2252 | -468 | 22 | -195 |
| 22 | 2790 | -254 | 55 | -678 |
| 23 | 3416 | -695 | 60 | -650 |
| 24 | 4002 | -837 | 78 | -855 |
| 25 | 4549 | -686 | 109 | -1289 |
| 26 | 5136 | -837 | 126 | -1487 |
| 27 | 5761 | -1272 | 132 | -1464 |
| 28 | 6348 | -1421 | 150 | -1664 |
| 29 | 6885 | -1203 | 183 | -2249 |
| 30 | 7490 | -1481 | 195 | -2248 |
| 31 | 8076 | -1623 | 214 | -2454 |
| 32 | 8645 | -1646 | 237 | -2752 |
| 33 | 9240 | -1854 | 252 | -2905 |

CONVERSION BETWEEN COLOR SPACES

TECHNICAL FIELD

The present disclosure relates generally to conversions between color spaces and more particularly to a method of converting between color spaces using Gamut Mapping Algorithms (GMAs).

BACKGROUND

Colors may be described as different combinations of the red, green, and blue primary lights ("RGB primaries") of an RGB color space. The main purpose of the RGB color space is for the sensing, representation, and display of images in electronic systems (such as televisions and computers). Different RGB primaries (and RGB color spaces) have been specified to fill the needs of different users and applications. For example, BT.709 specifies the primaries for high-definition (HD) television, and SMPTE Free Scale Gamut (FS-Gamut) defines the primaries for 2K and 4K digital cinema production. The BT.709 primaries have been incorporated into the sRGB standard which is widely used in computing. Currently, most hardware (e.g. computer graphics boards) is capable of storing, producing, or converting media (e.g. digital movies) into RGB data.

To compare one RGB color space to another, it is useful to have a standardized general space within which any visible color can be defined. The CIE (*Commission Internationale de L'Éclairage*) 1931 XYZ color space ("XYZ color space") serves as a standard reference against which different RGB color spaces may be defined. The XYZ color space encompasses all color sensations that an average person can experience. More specifically, the XYZ tristimulus values in the XYZ color space correlate to the spectral sensitivity of human vision. In the XYZ color space, any color is represented by an all-positive set of tristimulus values.

The concept of color may also be divided into two parts: chromaticity and luminance Since the Y parameter in the XYZ color space is a measure of the luminance of a color, the XYZ tristimulus values may be normalized to obtain two chromaticity values, x and y, that can be plotted in 2-dimensional space to yield the [x, y] chromaticity diagram. The derived color space specified by x, y, and Y is known as the CIE xyY color space, and is widely used to specify colors in practice.

An RGB color space can be defined using the x and y chromaticity values for the RGB primaries and a white point along a gamma correction curve. For example, the range of colors (gamut) that can be formed from a given set of RGB primaries is given in the [x, y] chromaticity diagram by a triangle whose vertices are the chromaticities of the primaries.

As previously mentioned, the XYZ color space serves as a standard color space from which other RGB color spaces (including non-RGB color spaces) may be defined. As such, it is advantageous to be able to convert from an RGB color space to the XYZ color space and vice versa. For example, a first RGB color space may be converted to the XYZ color space before being converted to a second RGB color space.

If an RGB color space is linear, the RGB values in a particular set of primaries can be converted to the corresponding XYZ values in the XYZ color space using a 3×3 transformation matrix M:

$$\begin{bmatrix} X \\ Y \\ Z \end{bmatrix} = M * \begin{bmatrix} R \\ G \\ B \end{bmatrix} = \begin{bmatrix} X_r & X_g & X_b \\ Y_r & Y_g & Y_b \\ Z_r & Z_g & Z_b \end{bmatrix} \begin{bmatrix} R \\ G \\ B \end{bmatrix}$$

where X, Y, and Z are the desired tristimulus values; R, G, and B are the displayed RGB values; and the 3×3 transformation matrix M includes the measured tristimulus values for the three channels in a display (e.g., $X_r$, $Y_r$, and $Z_r$ are the measured tristimulus values for the red channel at maximum emission).

The 3×3 transformation matrix M is a square matrix and can be inverted. Thus, the XYZ color space can be easily converted to the RGB color space using the inverse of the transformation matrix M ($M^{-1}$):

$$\begin{bmatrix} R \\ G \\ B \end{bmatrix} = M^{-1} * \begin{bmatrix} X \\ Y \\ Z \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X \\ Y \\ Z \end{bmatrix}$$

In recent years, new display technologies have been developed that extend color spaces to more than three primaries (herein referred to as "multi-primary color spaces"). For example, an RGBE backlight uses emerald LEDs (light-emitting diodes) in addition to red, green, and blue LEDs. As a result, the RGBE color space consists of four primaries (red, green, blue, and emerald). Similarly, an RGBCW color filter array (for example, PenTile™ RGBCW array) includes cyan and white in addition to the red, green, and blue primaries. Accordingly, the RGBCW color space consists of five primaries (red, green, blue, cyan, and white).

The multi-primary color spaces can be converted to the XYZ color space using standard procedures known to those skilled in the art. For example, the RGBE values in the RGBE color space can be converted into the corresponding XYZ values in the XYZ color space using a non-square transformation matrix M':

$$\begin{bmatrix} X \\ Y \\ Z \end{bmatrix} = M' * \begin{bmatrix} R \\ G \\ B \\ E \end{bmatrix} = \begin{bmatrix} X_r & X_g & X_b & X_e \\ Y_r & Y_g & Y_b & Y_e \\ Z_r & Z_g & Z_b & Z_e \end{bmatrix} \begin{bmatrix} R \\ G \\ B \\ E \end{bmatrix}$$

where X, Y, and Z are the desired tristimulus values; R, G, B, and E are the displayed RGBE values; and the transformation matrix M' includes the measured tristimulus values for the four channels in the RGBE backlight (e.g., $X_e$, $Y_e$, and $Z_e$ are the measured tristimulus values for the emerald channel at maximum emission). In particular, the transformation matrix M' for converting from the RGBE color space to the XYZ color space may be generated using chromaticity and luminosity measurements of the RGBE backlight primaries at full brightness.

To leverage the new display technologies listed above, there is a need to convert RGB values in the RGB color space to their corresponding values in a multi-primary color space. For example, there is a need to convert RGB values into RGBE values, so as to make full use of the RGBE backlight. However, there is currently no direct and efficient method for converting RGB values into RGBE values. Although the RGB values and RGBE values can be easily converted into XYZ values (using the respective transformation matrices M and M'), it is difficult to convert the XYZ values into RGBE values because the matrix M' is non-square and cannot be inverted.

In fact, any transformation matrix that is used to convert a multi-primary color space (e.g., RGBE, RGBCW, RGB-CWE, etc.) to the XYZ color space is likely to be a non-square m×n matrix (where m≠n). Unlike the 3×3 square transformation matrix M, the non-square m×n matrix is non-invertible. As a result, it is difficult to convert from the XYZ color space to the multi-primary color spaces.

Accordingly, there is a need for methods and systems that enable quick and efficient conversions from the XYZ color space to the multi-primary color spaces.

SUMMARY

In one aspect, the inventive concept pertains to a computer-implemented method for converting a first color space to a second color space. The method includes generating a look-up table (LUT) using a non-square transformation matrix and a numerical solver, wherein the LUT comprises a target value in the first color space and an optimal value in the second color space, and using the LUT to convert the first color space to the second color space.

In another aspect, the inventive concept pertains to an apparatus for converting a first color space to a second color space. The apparatus includes a color space converter configured to generate a look-up table (LUT) using a non-square transformation matrix and a numerical solver, wherein the LUT comprises a target value in the first color space and an optimal value in the second color space, and use the LUT to convert the first color space to the second color space.

In yet another aspect, the inventive concept pertains to a non-transitory computer-readable medium storing instructions that, when executed, causes a computer to perform a method for converting a first color space to a second color space. The method includes generating a look-up table (LUT) using a non-square transformation matrix and a numerical solver, wherein the LUT comprises a target value in the first color space and an optimal value in the second color space, and using the LUT to convert the first color space to the second color space.

DESCRIPTION OF THE DRAWINGS

FIGS. 3A and 3B illustrate the extent of the normalized matrices M and M" in CIE xyY and XYZ, respectively.

DETAILED DESCRIPTION

Reference will now be made in detail to the exemplary embodiments illustrated in the accompanying drawings. Wherever possible, the same reference numbers will be used throughout the drawings to refer to the same or like parts.

The methods and systems disclosed herein address the above described needs. For example, the methods and systems disclosed herein enable quick conversions from the XYZ color space to multi-primary color spaces, by utilizing computationally efficient Gamut Mapping Algorithms (GMAs). The GMAs include generating Look-Up Tables (LUTs) comprising a plurality of color space conversion values, and using the LUTs to convert from one color space to another color space.

Although aspects of the inventive concept will be described in the context of color spaces, it will be understood that this is not a limitation of the inventive concept and the concepts disclosed herein can be adapted to other applications, such as the mapping and/or transformation between multi-dimensional spaces.

Figure 1:
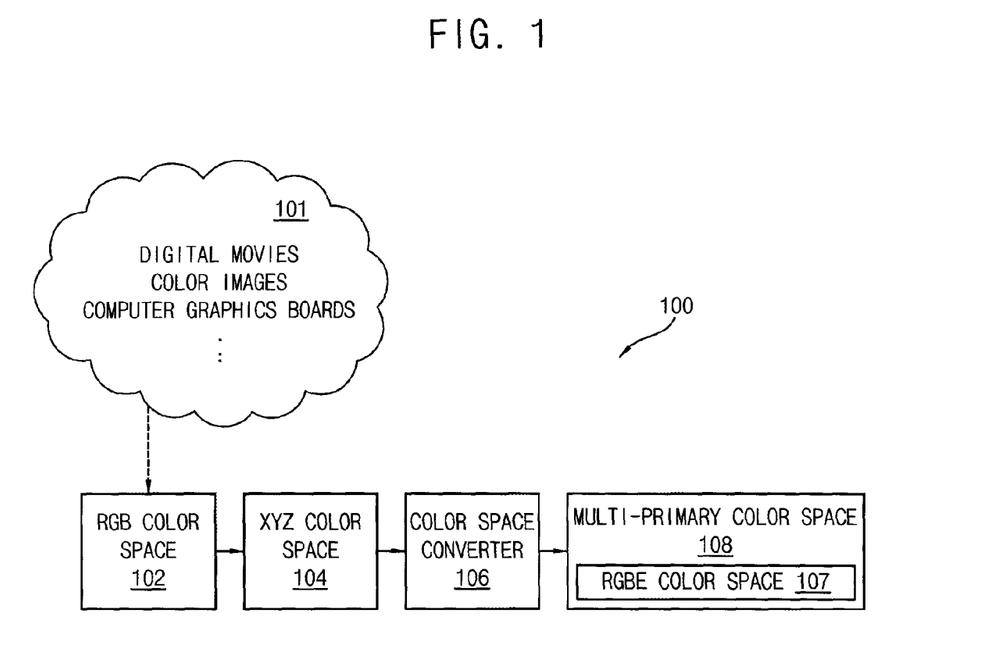
FIG. 1 illustrates a block diagram of an exemplary system 100 according to an embodiment of the inventive concept.

FIG. 1 illustrates a block diagram of an exemplary system 100 according to an embodiment of the inventive concept. As shown in FIG. 1, the system 100 includes an RGB color space 102, an XYZ color space 104, a color space converter 106, and a multi-primary color space 108.

The RGB color space 102 contains input RGB data obtained from an RGB data source 101. The RGB data source 101 may include multi-media information (e.g. digital movie files, streaming videos, color images, etc.) and/or hardware (e.g. computer graphics boards).

The XYZ color space 104 corresponds to the CIE 1931 XYZ color space.

The RGB data in the RGB color space 102 can be converted into XYZ data in the XYZ color space 104 using commonly known transformation matrices (e.g. the square transformation matrix M discussed in the Background section).

The multi-primary color space 108 includes different types of color spaces. The multi-primary color space 108 may be associated with an output display device, for example, an RGBE backlight. The multi-primary color space 108 may include color spaces having more than three primaries (e.g. RGBE, RGBW, RGBCW, RGBCWE, etc.). As shown in FIG. 1, the multi-primary color space 108 may include an RGBE color space 107.

The color space converter 106 enables data to be converted from the XYZ color space 104 to the multi-primary color space 108. For example, the color space converter 106 can convert values in the XYZ color space 104 to their corresponding values in the RGBE color space 107. The color space converter 106 can be implemented as a software program executing in a processor and/or as hardware that performs color space conversion utilizing GMAs. In some embodiments, the color space converter 106 can identify the type of multi-primary color space 108 (e.g. RGBE color space 107) in an output device, so as to determine an appropriate GMA for converting the XYZ color space 104 to the identified multi-primary color space.

As previously mentioned in the Background section, the RGB color space 102 can be easily converted to and from the XYZ color space 104 using the 3×3 transformation matrix M and its inverse matrix $M^{-1}$. Although the RGBE color space 107 can be converted to the XYZ color space 104 using the transformation matrix M', it is difficult to convert the XYZ color space 104 to the RGBE color space 107 because the transformation matrix M' is non-square and cannot be inverted.

Thus, when the multi-primary color space 108 includes more than three primaries (e.g., RGBE, RGBCW, RGB-CWE, etc.), the transformation matrix for converting the multi-primary color space 108 to the XYZ color space 106 is likely to be a non-square m×n matrix (where m≠n) that is non-invertible, and that cannot be solved for analytically.

The present inventive concept addresses and overcomes the above limitations relating to the conversion from the XYZ color space 104 to the RGBE color space 107, by using the RGBE-to-XYZ transformation matrix M' and a numerical solving technique to generate a LUT for approximating the inverse of the non-square matrix M'.

It should be noted that the inventive concept is not merely limited to conversions from the XYZ color space to the RGBE color space, but may be modified to convert from the XYZ color space to other types of multi-primary color spaces (e.g., RGBCW, RGBCWE, etc.).

Figure 2:
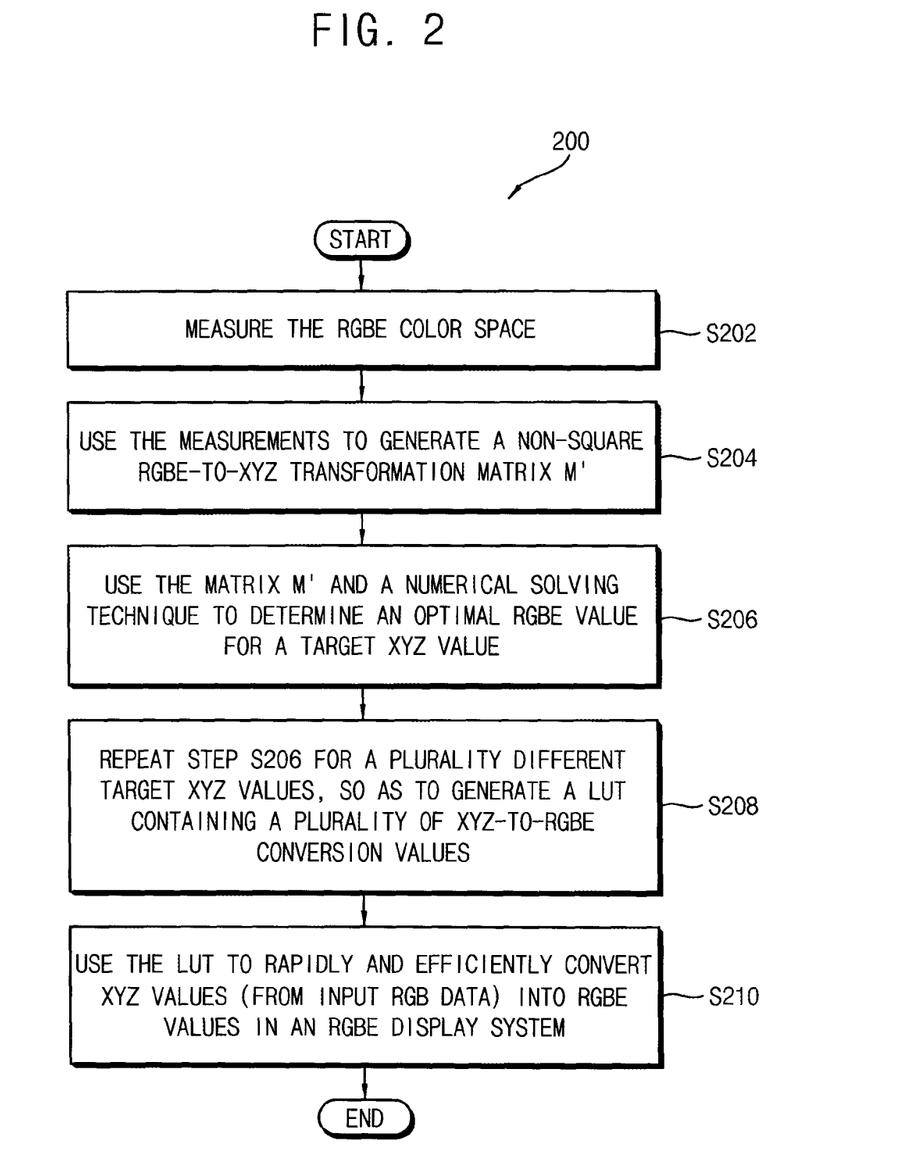
FIG. 2 is a flow chart illustrating an exemplary method 200 for converting the XYZ color space 104 to the RGBE color space 107.

FIG. 2 is a flow chart illustrating an exemplary method 200 for converting the XYZ color space 104 to the RGBE color space 107.

First, the RGBE color space 107 is measured and a plurality of measurements are collected (Step S202). The measurements include the measured tristimulus values for the four channels in the RGBE backlight (e.g., $X_e$, $Y_e$, and $Z_e$ are the measured tristimulus values for the emerald channel at maximum emission). The measurements may include chromaticity and luminosity measurements of the RGBE backlight primaries at full brightness. The measurements are then used to generate the non-square RGBE-to-XYZ transformation matrix M' (Step S204).

Next, the RGBE-to-XYZ transformation matrix M' is used in conjunction with a numerical solving technique to determine an optimal RGBE value for a target XYZ value (Step S206). Step S206 is then repeated for a plurality of different XYZ values, so as to generate a LUT containing a plurality of XYZ-to-RGBE conversion values (Step S208). Accordingly, the LUT can be used to rapidly and efficiently convert XYZ values (from input RGB data) into RGBE values in an RGBE display system (Step S210).

It is noted that in some cases, the RGBE color space 107 may be partially converted to the XYZ color space 104 using a plurality of square transformation matrices. The square transformation matrices may include the 3×3 transformation matrix M for converting RGB to XYZ and a 3×3 transformation matrix M" for converting GBE to XYZ.

The 3×3 transformation matrix M for converting RGB values in an RGBE backlight to XYZ values is shown below:

$$\begin{bmatrix} X \\ Y \\ Z \end{bmatrix} = M * \begin{bmatrix} R \\ G \\ B \end{bmatrix} = \begin{bmatrix} X_r & X_g & X_b \\ Y_r & Y_g & Y_b \\ Z_r & Z_g & Z_b \end{bmatrix} \begin{bmatrix} R \\ G \\ B \end{bmatrix}$$

where X, Y, and Z are the desired tristimulus values; R, G, and B are the displayed RGB values; and the 3×3 transformation matrix M includes the measured tristimulus values for the RGB channels in the RGBE backlight (e.g., $X_r$, $Y_r$, and $Z_r$ are the measured tristimulus values for the red channel at maximum emission).

The 3×3 transformation matrix M" for converting GBE in an RGBE backlight to XYZ is shown below:

$$\begin{bmatrix} X \\ Y \\ Z \end{bmatrix} = M'' * \begin{bmatrix} G \\ B \\ E \end{bmatrix} = \begin{bmatrix} X_g & X_b & X_e \\ Y_g & Y_b & Y_e \\ Z_g & Z_b & Z_e \end{bmatrix} \begin{bmatrix} G \\ B \\ E \end{bmatrix}$$

where X, Y, and Z are the desired tristimulus values; G, B, and E are the displayed GBE values; and the 3×3 transformation matrix M" includes the measured tristimulus values for the GBE channels in the RGBE backlight (e.g., $X_g$, $Y_g$, and $Z_g$ are the measured tristimulus values for the green channel at maximum emission).

Since the Y parameter in the XYZ color space 104 is a measure of the luminance of a color, the above transformation matrices M and M" may be normalized to the same Y values. When the E value is zero (i.e., when the emerald LED is off), the same XYZ value will be obtained from the GBE and RGB color spaces using the respective M" and M matrices.

Figure 3A:
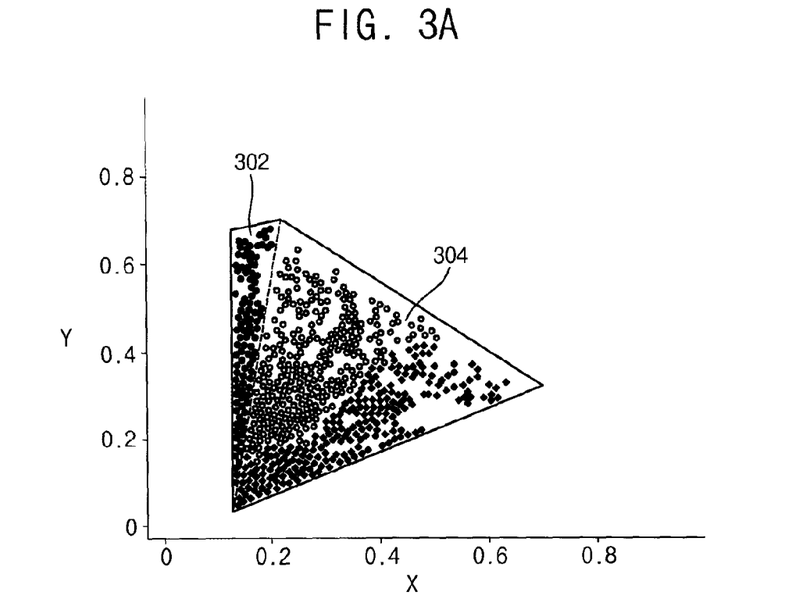
Figure 3B:
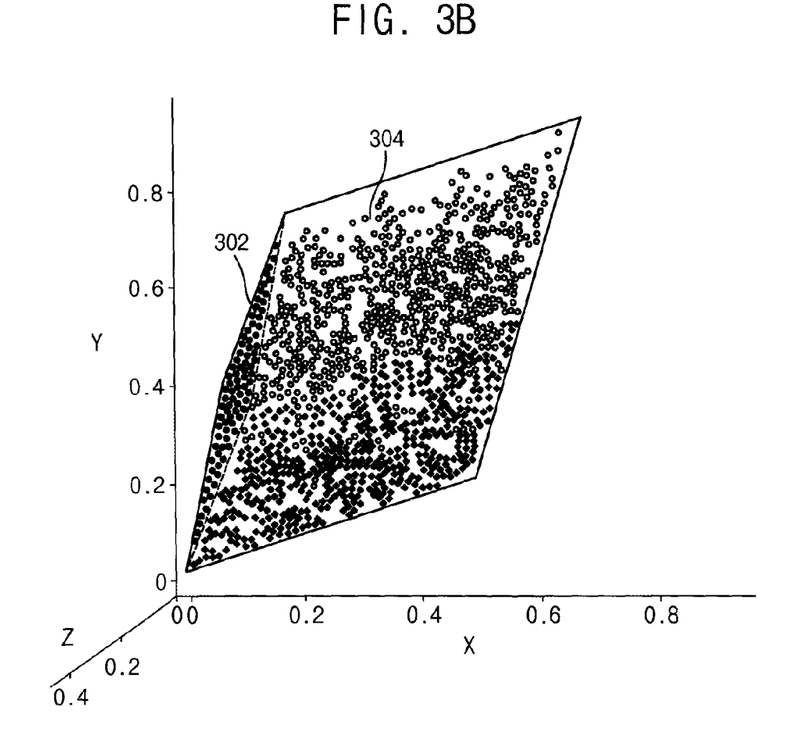

FIGS. 3A and 3B illustrate the extent of the normalized matrices M and M" in CIE xyY and XYZ, respectively. The CIE xyY in FIG. 3A depicts an [x, y] chromaticity diagram in 2-dimensional space, and the CIE XYZ in FIG. 3B depicts the XYZ color space in 3-dimensional space. In particular, FIGS. 3A and 3B show that the RGBE color space 107 may be analyzed in two parts comprising a first region 302 and a second region 304.

Referring to FIGS. 3A and 3B, the first region 302 defines colors reachable by the GBE conversion and the second region 304 defines colors reachable by the RGB conversion. In FIGS. 3A and 3B, solid dots, circles and solid diamonds indicate different colors from one another among a red color, a green color, a blue color, an emerald color or any mixture thereof.

Since the 3×3 transformation matrices M and M" are square matrices, they can be inverted. Accordingly, any point inside the RGBE gamut can be converted to the XYZ color space using the inverted matrix $M^{-1}$ or the inverted matrix $M''^{-1}$. However, any point inside the RGBE gamut may not be converted using both inverted matrices (except for some points lying on the border between the first region 302 and the second region 304). Thus, the inverted matrix $M''^{-1}$ is limited in that it does not apply to XYZ points lying outside the first region 302. Likewise, the inverted matrix $M^{-1}$ is limited in that it does not apply to XYZ points lying outside the second region 304.

Although one of the inverted matrix $M^{-1}$ and the inverted matrix $M''^{-1}$ may produce a solution for converting a point inside the RGBE color space 107 to the XYZ color space 104, the solution is still not optimal for the following reasons. First, the solution from either $M^{-1}$ or $M''^{-1}$ requires at least one primary color set to zero (RGB0 or 0GBE), which may result in dark spots in the display affecting the quality of the displayed images. In addition, if the color in an image slowly changes from, for example, green to emerald, a point may occur where the solution suddenly switches from one primary to another and this may create a visible contour.

The inventive concept circumvents the above conversion issues, by using the non-square RGBE-to-XYZ transformation matrix M' instead of the square matrices M and $M^{-1}$ for conversions. Specifically, the transformation matrix M' allows solutions to be obtained in transition zones that have some green and some emerald on at the same time. As a result, a more efficient solution for converting the XYZ color space 104 to the RGBE color space 107 can be obtained using the transformation matrix M' with a numerical solving technique, as described in more detail with reference to FIG. 4 to FIG. 6, FIG. 7A and FIG. 7B.

Figure 4:
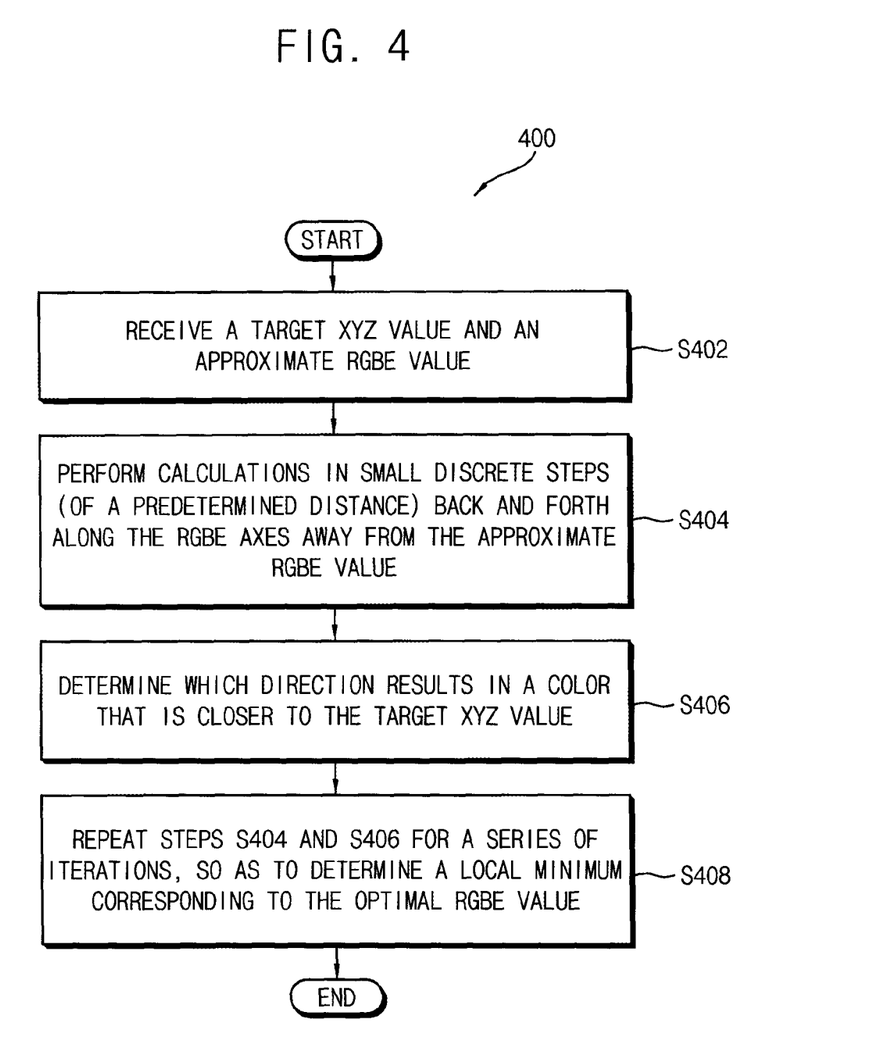
FIG. 4 is a flow chart illustrating an exemplary method 400 for determining an optimal RGBE value, by using the numerical solving technique and the RGBE-to-XYZ transformation matrix M' described in FIG. 2.

FIG. 4 is a flow chart illustrating an exemplary method 400 for determining an optimal RGBE value, by using the numerical solving technique and the RGBE-to-XYZ transformation matrix M' described in step S206 of FIG. 2.

The numerical solving technique includes the use of numerical solvers to generate LUTs to approximate the inverse of the non-square RGBE-to-XYZ transformation matrix M'. The numerical solvers are based on numerical methods, and can be implemented offline in known manner, such as by stand-alone programs or with commercial software (e.g., MathCad™, Excel™, etc.).

Figure 5:
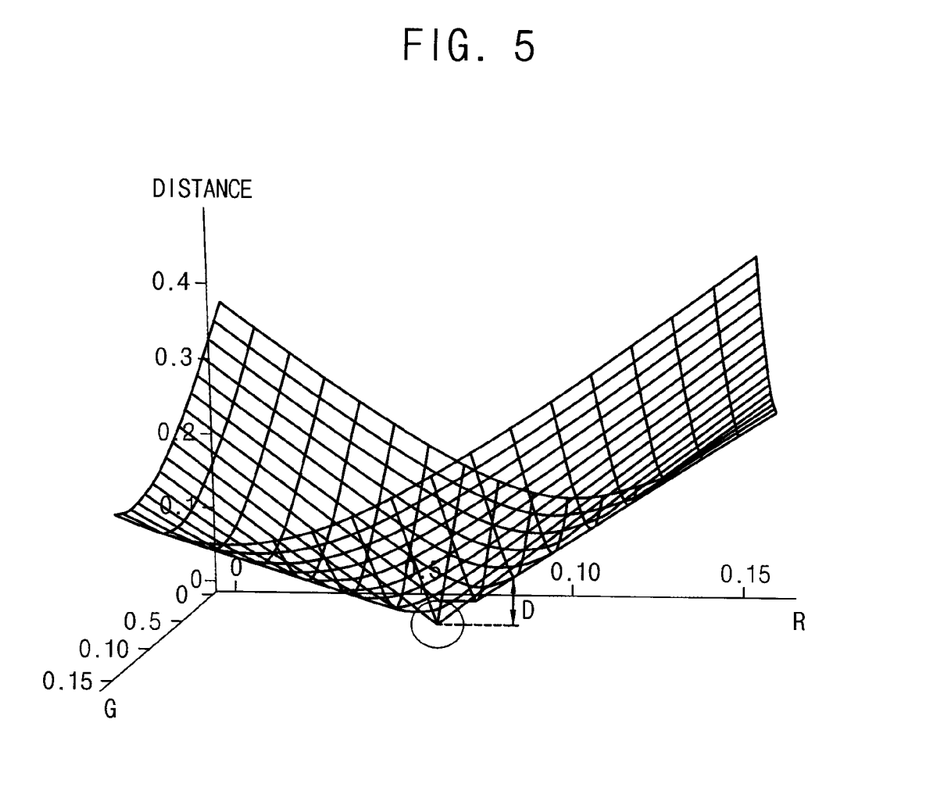
FIG. 5 illustrates a local minimum (corresponding to the optimal RGBE value) in the CIE XYZ space.

Referring to FIG. 4, a numerical solver first receives a target XYZ value and an approximate RGBE value (Step S402). The approximate RGBE value is an estimate of the RGBE value corresponding to the target XYZ value. Next, the solver performs calculations in small discrete steps (of a predetermined distance) back and forth along the RGBE axes away from the approximate RGBE value (Step S404), so as to determine which direction results in a color point that is closer to the target XYZ value (Step S406). The solver then repeats Steps S404 and S406 for a series of iterations, so as to determine a local minimum corresponding to the optimal RGBE value (Step S408). The local minimum (corresponding to the optimal RGBE value) is depicted in the CIE XYZ space illustrated in FIG. 5. Referring to FIG. 5, the horizontal axes indicate the results of changing only the R and G values, and the vertical axis indicates a distance D from the target XYZ value. The optimal RGBE value (i.e. the closest approximation of the RGBE value corresponding to the target XYZ value) is obtained based on the minimum of the distance D after the series of iterations.

The function (that the numerical solver is solving for) may be depicted as a 5-dimensional surface (R, G, B, E, and distance D). Accordingly, the function may have more than one local minimum for any given XYZ value, and that may result in the solver arriving at an incorrect local minimum. Furthermore, if the RGBE values are permitted to go out-of-gamut, there may be even more (incorrect) local minima that the solver may arrive at. Thus, the solution obtained by the solver may be highly sensitive to the choice of the target XYZ value and the approximate RGBE value. For example, if the RGBE value corresponding to the target XYZ value is substantially different from the approximate (input) RGBE value, the solver may eventually arrive at an incorrect local minimum, thereby yielding an incorrect RGBE value.

To avoid arriving at an incorrect local minimum, one or more of the following techniques may be used.

For example, in one embodiment, after a local minimum with a distance D1 has been determined, the solver may subsequently perform several iterations in random directions away from the local minimum to determine whether another local minimum with a distance D2 exists (where D2<D1). If the solver determines that a local minimum with a distance D2 exists, the solver then selects that local minimum as the optimal RGBE value for the target XYZ value.

In a preferred embodiment, a bright white RGBE value may be input to the solver for any target XYZ value. This allows more space for the solver to traverse through the middle of the RGBE gamut into the local minimum, thereby increasing the likelihood that the correct local minimum is obtained.

Figure 6:
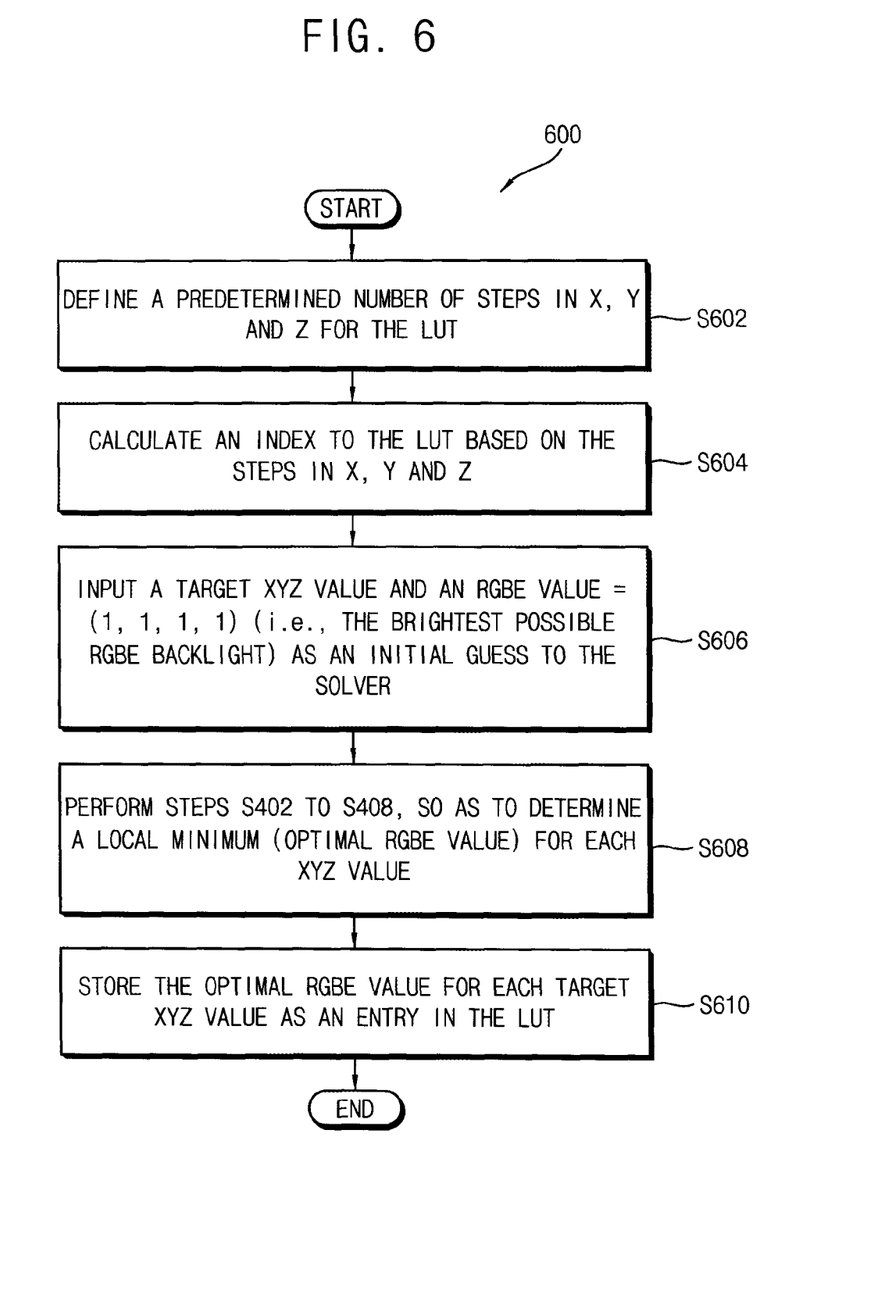
FIG. 6 is a flow chart illustrating an exemplary method 600 for generating a LUT containing a plurality of XYZ-to-RGBE conversion values.

FIG. 6 is a flow chart illustrating an exemplary method 600 for generating a LUT containing a plurality of XYZ-to-RGBE conversion values. As previously described, the LUT can be used to rapidly and efficiently convert the XYZ color space 104 to the RGBE color space 107.

To generate the XYZ-to-RGBE LUT, iterative loops may be performed for a plurality of target XYZ values. First, a predetermined number of steps may be defined in X, Y, and Z (Step S602). For example, 16 steps may be defined in X and Y from 0 to 1 in steps of 1/15. In some embodiments, the Z values for the RGBE backlight may range from 0 to about 1.8. In those embodiments, 27 steps may be defined in Z in steps of 1/15 (with the same increments as in X and Y). The LUT may be organized with the Z values changing the slowest and the X values changing the fastest. Given a floating point XYZ value, the floating point values are multiplied by 15, truncated to integers, and an index to the LUT is then calculated from X+16*Y+16*16*Z (Step S604). At the end of the iterative loops, the LUT in the above example should contain 7168 entries consisting of three 12-bit numbers. The entries correspond to a plurality of different target XYZ values. It is noted that the number of steps that can be defined in X, Y, and Z typically depends on the hardware that is available.

Next, a target XYZ value and an RGBE value=(1, 1, 1, 1) (i.e. the brightest possible RGBE backlight) are input as an initial guess to a numerical solver (Step S606). The numerical solver may include the solver previously described with reference to FIGS. 4 and 5. Next, the solver performs Steps S402 to S408 (previously described in FIG. 4), so as to determine a local minimum (corresponding to the optimal RGBE value) for the target XYZ value (Step S608). The optimal RGBE value for the XYZ value is then stored as an entry in the LUT (Step S610). Steps S606 to S610 are then repeated for different target XYZ values (for example, the LUT may contain 7168 entries or 7168 different target XYZ values). At the end of the conversions, the LUT is populated with a plurality of XYZ-to-RGBE conversion values.

In some embodiments, the LUT may be initially sparsely filled, and subsequently fully populated during run-time by interpolation. The interpolation between the points in the LUT may be linear or cubic.

In the method of FIG. 6, although the initial guess (corresponding to the brightest possible RGBE backlight) may require the solver to be more computationally intensive for darker values, the initial guess is likely to produce more accurate results within the volume of interest between RGB and GBE. In some other embodiments, the initial guess may be defined at the center of the volume of interest between RGB and GBE. Alternatively, in some further embodiments, the initial guess may be defined by in-gamut values that are located sufficiently far away from the R, G, B, or E corners.

In some embodiments, the plurality of XYZ values in the LUT need not be evenly spaced. For example, the set of XYZ values may be non-uniformly spaced, such that there are fewer XYZ values in regions where human color sensitivity is lower (for example, along the Y axis (luminance) for same colors) and more XYZ values in regions where human vision is more sensitive. In some instances, the non-uniform spacing of XYZ values may decrease the size of the LUT which saves hardware memory space.

According to the inventive concept, different LUTs can be generated using different embodiments of the numerical solver.

In a first embodiment, the solver produces an in-gamut local minimum for every target XYZ value by performing calculations in small discrete steps to determine the optimal RGBE value, provided the steps remain inside the RGBE gamut. Consistent with the earlier description, the optimal RGBE value corresponds to an RGBE coordinate that, when converted to XYZ coordinate, is closest to the target XYZ value at the end of the iterations. Therefore all the RGBE values in the resulting LUT (see, e.g., LUT 702 in FIG. 7A) are either zero or positive, and fit within a fixed bit size (which reduces hardware requirements). If the gamut of the RGBE backlight is large, the input sRGB gamut can be stretched to fill the RGBE gamut. Accordingly, it is of no consequence that some of the RGBE values may be clamped, because the LUT will not have out-of-gamut values.

In a second embodiment, the solver may solve for out-of-gamut RGBE values. For example, negative RGBE values and/or RGBE values greater than the maximum RGBE value may be produced when the target XYZ value cannot be converted to an in-gamut RGBE value. It is noted that in practice, the out-of-gamut RGBE values cannot be displayed. Furthermore, two additional bits per primary may be required to store the out-of-gamut values (both negative RGBE and greater-than-maximum RGBE values) in the resulting LUT (see, e.g., LUT 708 in FIG. 7B). However, the out-of-gamut values may be useful for other purposes. For example, the out-of-gamut values can serve as data points for cubic interpolation, which allows more accurate interpolated values to be obtained for values near the edge of the gamut (when compared to linear interpolation).

Figure 7A:
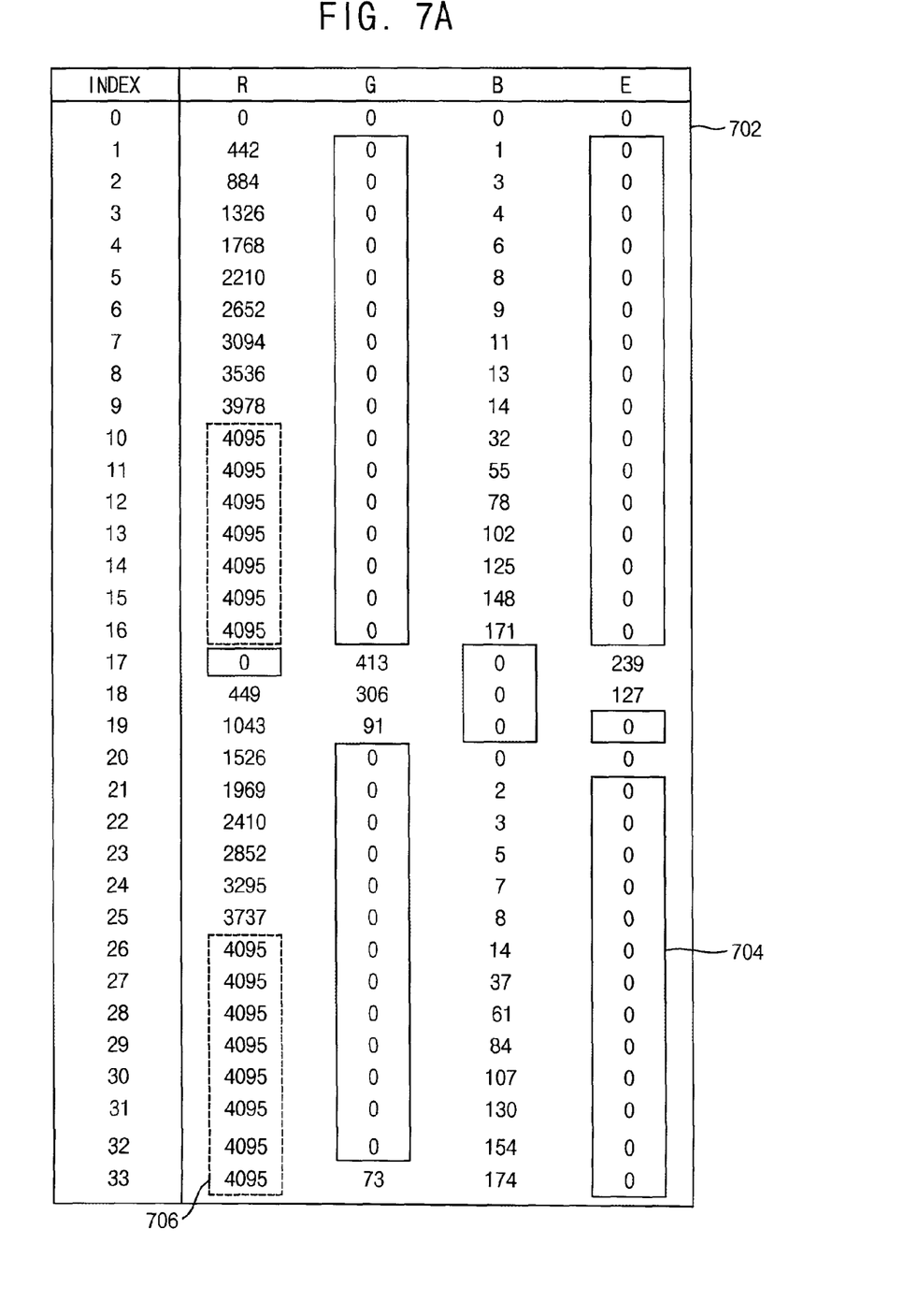
FIG. 7A illustrates the first 34 values of a LUT 702 built using the solver according to a first embodiment.

FIG. 7A illustrates the first 34 values of a LUT 702 built using the solver according to the first embodiment. As previously described, the solver according to the first embodiment produces an in-gamut local minimum for every target XYZ value provided by performing calculations in small discrete steps to determine the optimal RGBE value, provided the steps remain inside the RGBE gamut. In the example of FIG. 7A, the LUT 702 is built with 12 bits per primary, and therefore values over $4095(2^{12}-1)$ are out-of-gamut. As such, most of the 0 and 4095 values indicate clamped values. For example, referring to FIG. 7A, the 0 values in the solid boxes 704 correspond to negative RGBE values that have been clamped, and the 4095 values in the dashed boxes 706 correspond to out-of-gamut RGBE values that have been clamped.

Figure 7B:
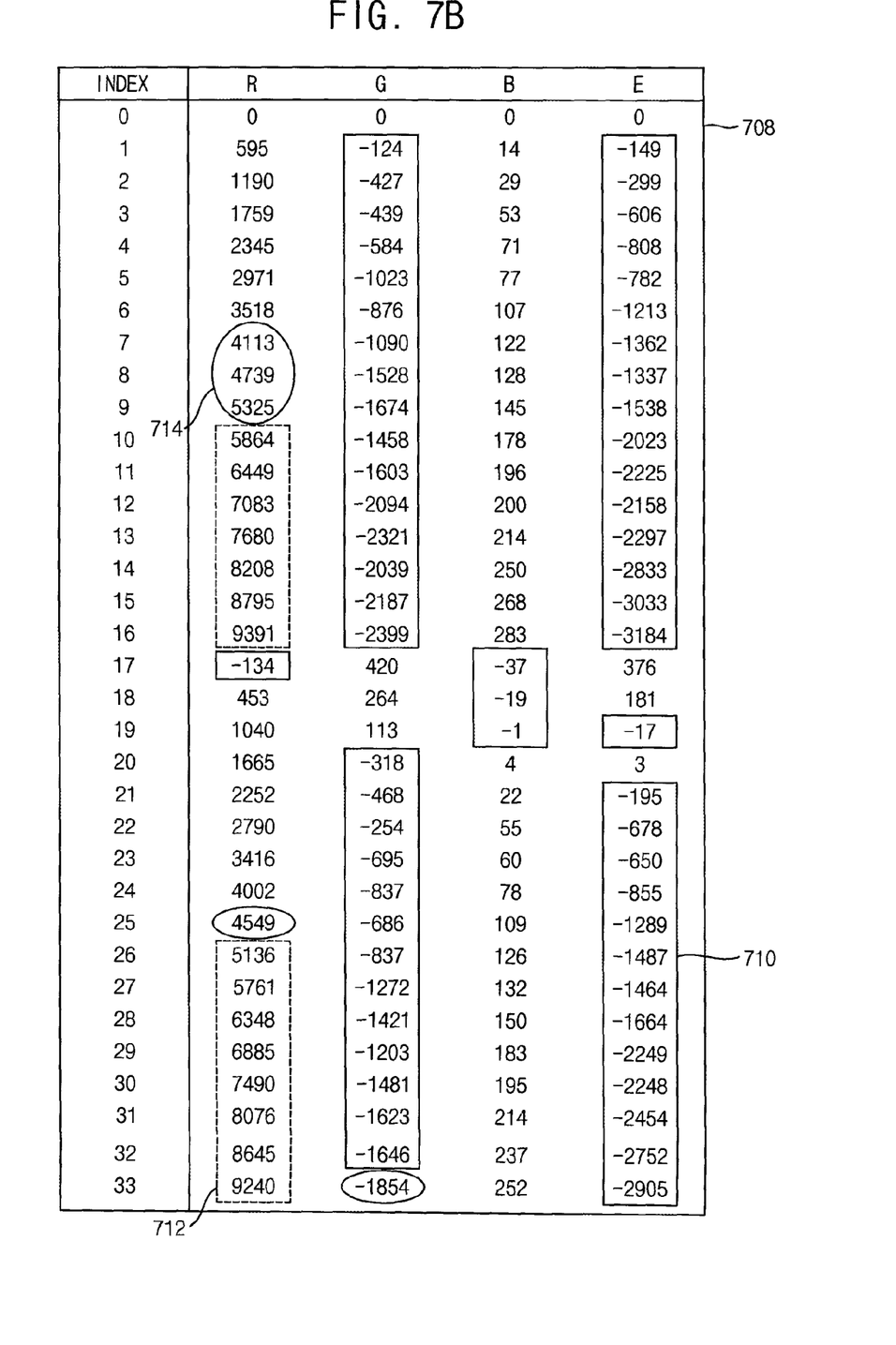
FIG. 7B illustrates the first 34 values of a LUT 708 built using the solver according to a second embodiment.

FIG. 7B illustrates the first 34 values of a LUT 708 built using the solver according to the second embodiment. As previously described, the solver according to the second embodiment may solve for out-of-gamut values. In the example of FIG. 7B, the LUT 708 is built with 12 bits per primary, and therefore values over 4095 $(2^{12}-1)$ are out-of-gamut. As shown in FIG. 6B, the LUT 708 includes out-of-gamut values (negative RGBE values in the solid boxes 710, and greater-than-maximum RGBE values in the dotted boxes 712).

Comparing the LUTs 702 and 708 in FIGS. 7A and 7B, it is noted that the clamped values (see, e.g., regions 704 and 706) selected by the solver according to the first embodiment differ significantly from the out-of-gamut values (see, e.g., regions 710 and 712) selected by the solver according to the second embodiment. The RGBE gamut may be visualized as a cube, and the solution space may be visualized as a paraboloid with its bottom point lying outside the cube but having part of its surface inside the cube. The solver according to the second embodiment does not have the restriction that a value has to be in-gamut. Thus, for out-of-gamut values, the solver according to the second embodiment can traverse through the gamut all the way down to the bottom point outside of the cube and out of gamut. In contrast, the solver according to the first embodiment imposes the restriction that a value has to lie at a point on the surface of the gamut, which may be located far away from the out-of-gamut value. Thus, for out-of-gamut values, the solver according to the first embodiment traverses through the gamut until it reaches the edge of the cube, and then solves along the intersection of the surface of the cube and the paraboloid which is along a parabola. The parabola has a minimum point that is closest to the target XYZ value, but has different values in all the RGBE primaries.

Thus, it may be observed that the RGBE primaries change to adjust to the restricted minimum when using the solver according to the first embodiment. In contrast, the RGBE primaries remain unchanged when using the solver according to the second embodiment. As a result, some values that are in-gamut in the LUT 702 of FIG. 7A may actually correspond to out-of-gamut values in the LUT 708 of FIG. 7B (compare, for example, the values within the circled regions 714 in LUT 708 with the corresponding values in LUT 702).

Accordingly, the XYZ color space 104 can be converted to the RGBE color space 107 using the LUTs. In some embodiments, the XYZ color space 104 may be converted to the RGBE color space 107 using the LUT 702 of FIG. 7A, whereby the LUT 702 is generated using a first numerical solver. In some other embodiments, the XYZ color space 104 may be converted to the RGBE color space 107 using the LUT 702 of FIG. 7A and the LUT 708 of FIG. 7B, whereby the LUT 702 is generated using a first numerical solver and the LUT 708 is generated using a second numerical solver.

Embodiments of the inventive concept and all of the functional operations described in this specification can be implemented in digital electronic circuitry, or in computer software, firmware, or hardware, including the structures disclosed in this specification and their structural equivalents, or in combinations of one or more of them. The central server of the inventive concept can be implemented as a combination of computer hardware including a processor and a memory with one or more computer program products, i.e., one or more modules of computer program instructions encoded on a computer-readable medium for execution by, or to control the operation of, data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the inventive concept can be implemented in a computing system that includes a back-end component, e.g., as a central server, or that includes a middleware component, e.g., an application server, or that includes a front-end component, e.g., a computer at a terminal having a graphical player interface or a Web browser through which a player can interact with an implementation of the inventive concept, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of the inventive concept or of what can be claimed, but rather as descriptions of features specific to particular embodiments of the inventive concept. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

It should be understood that the inventive concept can be practiced with modification and alteration within the spirit and scope of the appended claims. The description is not intended to be exhaustive or to limit the inventive concept to the precise form disclosed. It should be understood that the inventive concept can be practiced with modification and alteration.

What is claimed is:

1. A computer-implemented method for converting a first color space to a second color space, comprising:
    generating a look-up table (LUT) using a non-square transformation matrix and a numerical solver, wherein the LUT comprises a target value in the first color space and an optimal value in the second color space;
    defining a predetermined number of steps in respective axes of the first color space and calculating an index to the LUT based on the predetermined number of steps defined in the respective axes of the first color space, wherein the index includes a plurality of target values in the first color space; and
    converting the first color space to the second color space using the LUT,
    wherein the numerical solver is configured to:
    receive each target value in the first color space and a predefined value in the second color space;
    perform calculations in discrete steps of a predetermined distance along respective axes in the second color space away from the predefined value in the second color space;
    determine which direction results in a color that is closer to the target value in the first color space;
    repeat the calculations and direction determination for a series of iterations, so as to determine a local minimum corresponding to the optimal value in the second color space; and
    store, in the LUT, the optimal value in the second color space for each target value in the first color space.

2. The method of claim 1, wherein the first color space includes an XYZ color space comprising XYZ tristimulus values, and the second color space includes a color space comprising more than three primaries.

3. The method of claim 2, wherein the second color space includes a red, green, blue, and emerald (RGBE) color space.

4. The method of claim 2, wherein the non-square transformation matrix is generated using measurements of the XYZ tristimulus values in the second color space.

5. The method of claim 1, wherein the non-square transformation matrix is configured for converting the second color space to the first color space.

6. The method of claim 1,
    wherein the plurality of target values are spaced evenly throughout the first color space.

7. The method of claim 1,
    wherein the plurality of target values are spaced non-evenly throughout the first color space.

8. The method of claim 1,
    wherein the predefined value corresponds to a maximum brightness value in the second color space.

9. The method of claim 1, wherein the numerical solver includes a first numerical solver configured to determine an in-gamut local minimum for the target value by performing calculations in discrete steps to obtain the optimal value, and wherein the steps are inside a gamut of the second color space.

10. The method of claim 9, wherein the LUT includes a first LUT, and the first numerical solver is configured to generate the first LUT.

11. The method of claim 10, wherein the first numerical solver is further configured to clamp the target value if the target value lies outside the gamut of the second color space, and to store the clamped value in the first LUT.

12. The method of claim 11, further comprising:
generating a first set of target values and optimal values, and
populating the first LUT with a plurality of target values and optimal values through linear interpolation of the first set of target values and optimal values.

13. The method of claim 1, wherein the numerical solver includes a second numerical solver configured to determine a local minimum for the target value by performing calculations in discrete steps to obtain the optimal value, and wherein the second numerical solver is allowed to step outside a gamut of the second color space.

14. The method of claim 13, wherein the LUT includes a second LUT, and the second numerical solver is configured to generate the second LUT.

15. The method of claim 14, further comprising:
generating a second set of target values and optimal values, wherein the second set includes values that are outside the gamut of the second color space; and
populating the second LUT with a plurality of target values and optimal values through linear interpolation and cubic interpolation of the second set of target values and optimal values.

16. An apparatus for converting a first color space to a second color space, comprising:
a processor; and
a memory for storing a look-up table (LUT) comprising a target value in the first color space and an optimal value in the second color space,
wherein the processor is configured to:
generate the LUT using a non-square transformation matrix and a numerical solver; and
convert the first color space to the second color space using the LUT, and
wherein the numerical solver is configured to:
perform calculations in discrete steps of a predetermined distance along respective axes in the second color space away from a predefined value in the second color space;
determine which direction results in a color that is closer to the target value in the first color space;
repeat the calculations and direction determination for a series of iterations; and
determine a local minimum corresponding to the optimal value in the second color space.

17. The apparatus of claim 16, wherein the first color space includes an XYZ color space comprising XYZ tristimulus values, and the second color space includes a color space comprising more than three primaries.

18. A non-transitory computer-readable medium storing instructions that, when executed, causes a computer to perform a method for converting a first color space to a second color space, the method comprising:
generating a look-up table (LUT) using a non-square transformation matrix and a numerical solver, wherein the LUT comprises a target value in the first color space and an optimal value in the second color space;
performing calculations in discrete steps of a predetermined distance along respective axes in the second color space away from a predefined value in the second color space;
determining which direction results in a color that is closer to the target value in the first color space;
repeating the calculations and direction determination for a series of iterations, so as to determine a local minimum corresponding to the optimal value in the second color space; and
converting the first color space to the second color space using the LUT.

* * * * *